Sept. 2, 1941.  H. P. PHILLIPS  2,254,753
PISTON RING
Filed Oct. 29, 1938
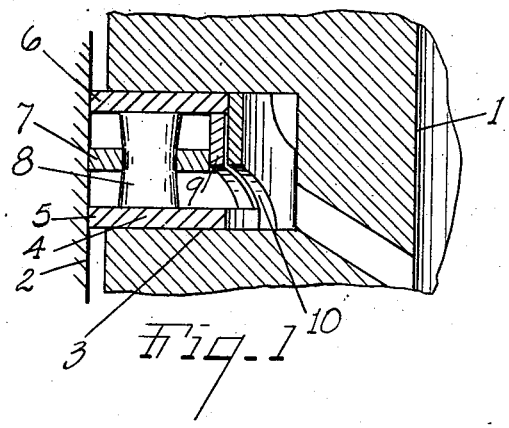
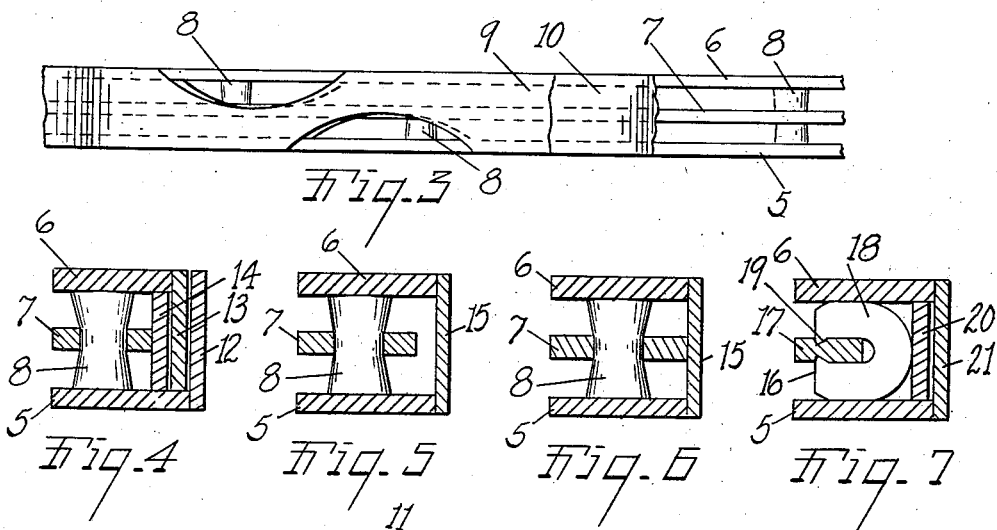
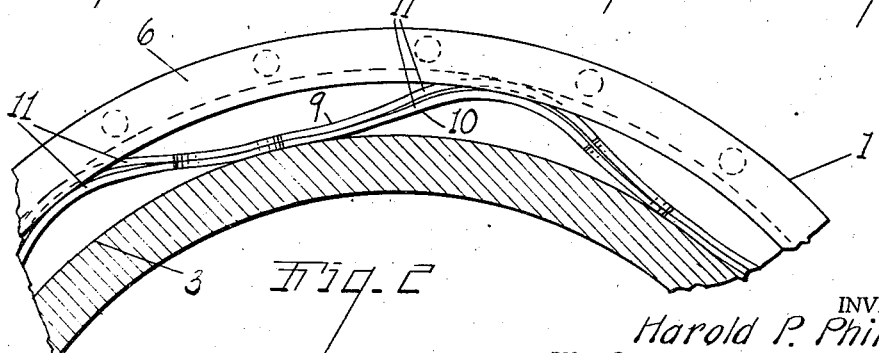
INVENTOR.
Harold P. Phillips
BY Earl & Chappell
ATTORNEYS Patented Sept. 2, 1941

2,254,753

UNITED STATES PATENT OFFICE 2,254,753

PISTON RING

Harold P. Phillips, Hastings, Mich., assignor to Hastings Manufacturing Company, Hastings, Mich.

Application October 29, 1938, Serial No. 237,687

11 Claims. (Cl. 309—45)

This invention relates to improvements in piston rings.

The main objects of my invention are:

First, to provide a composite piston ring having a plurality of cylinder wall engaging surfaces each having independent radial movement for oil collecting engagement with a cylinder wall.

Second, to provide a piston ring assembly including a pair of relatively hard cylinder wall engaging segments or elements, a spacer therebetween, and a plurality of inner springs assuring independent radial action of the first named elements.

Third, to provide a composite ring of the type described characterized by a minimum of wear between the parts thereof, whereby increased life of the assembly is assured.

Fourth, to provide a composite oil ring having improved provisions for cylinder wall engagement and for proper oil drainage.

Fifth, to provide a composite ring of the type described which assures high unit pressure on a cylinder wall yet without, however, an objectionably great total wall tension and resultant drag.

Further objects relating to details and economies of my invention will definitely appear from the description to follow. The invention is defined in the claims.

A structure embodying the features of my invention is illustrated in the accompanying drawing, wherein:

Fig. 1 is a fragmentary view in vertical section illustrating my improved composite ring assembly in operative relation to a piston and cylinder wall.

Fig. 2 is a fragmentary enlarged view in horizontal section further illustrating details of the construction.

Fig. 3 is a fragmentary view in side elevation to more clearly illustrate details of the construction.

Figs. 4, 5, 6, and 7 are views in transverse section illustrating modified embodiments of the composite ring of my invention.

The present invention relates to improvements in a composite ring of the type described and claimed in my Letters Patent No. 2,148,977, issued February 28, 1939. This case, like my copending application Serial No. 238,717, filed November 4, 1938, is concerned particularly with improvements in the aforesaid type of ring, which further minimize wear between the parts thereof and assure an independent action of the sealing sections of the composite ring.

In the drawing, which is greatly magnified for the purpose of more clearly illustrating the elements of the invention and in which no attempt has been made to illustrate the exact relative size of the parts, the reference numeral 1 designates a piston for an internal combustion engine which is reciprocable in a cylinder 2 and has an annular groove 3 containing the composite ring 4 of my invention. This composite ring or ring assembly consists of a pair of thin segments or elements 5, 6 which are split for insertion in the groove and are in expanding edge contact with the cylinder wall. These elements are of hard material, being formed preferably of ribbon steel. Between elements 5, 6 I dispose a third cylinder wall coacting ring or element 7 which, like the elements 5, 6, is of thin hard material, formed preferably of ribbon steel, and is split for assembly and expansion. The element 7 is of less radial thickness than the elements 5, 6 and carries a plurality of spacer lugs or rivet-like projections 8 which are secured in holes in the spacer element 7 preferably by upsetting or heading over the lugs on each end to an accurate over-all axial dimension. The said lugs are spaced sufficiently closely together circumferentially of element 7 whereby they engage the side elements 5, 6 and prevent axial sagging thereof; however the lugs 8 are far enough apart to secure adequate drainage of the oil removed from the cylinder wall 2 by all three of the elements 5, 6, 7.

Disposed between the side elements 5, 6 and in radial thrust engagement with the intermediate element 7 is an expander or steel expanding spring 9 of approximately the same width as the space between the elements 5, 6. Behind spring 9 I dispose a further spring 10 of substantially the same width as the axial dimension of the groove 3. Each of the expander springs 9, 10 is of general polygonal outline having rounded ring engaging bends or crimps 11 and being split for free action and insertion in groove 3.

In operation, it will be apparent that the outermost expander 9 engages the intermediate element 7 to thrust the same radially outward into effective engagement with the cylinder wall while the innermost expander 10 performs a similar function with respect to the outer elements 5, 6. Independent sealing action of the intermediate element 7 relative to the outer or side elements 5, 6 is thus attained and it is assured that at all times in the operation of the ring there will be a full peripheral sealing engagement of an element or elements, regardless of the taper or irregularities which are often present in a worn cylinder.

The advantages of my construction are that in its preferred form three narrow independently acting cylinder wall contacting areas are presented to the cylinder wall for the removal of excessive oil and effective sealing against "blow-by." Furthermore, the use of the spaced lug type of spacer element permits adequate drainage of the assembly without damming or interfering with the flow of oil through the ring and minimizes the frictional engagement of the ring elements with one another.

If desired and as shown and described in my copending application Serial No. 238,717, filed Nov. 4, 1938, it is possible to secure an independent action of the upper and lower steel elements 5, 6 relative to one another by forming the same of different radial thicknesses and by utilizing separate inner springs each of which is in radial thrust engagement with one, and only one, of the upper and lower elements 5, 6. Similarly, and if desired, my assembly may include only a single expander, if such is desired in the interest of economy.

In the present form, it is apparent that wear on the inner springs or expanders at the point of contact thereof with the steel sections is minimized, since it is distributed over a plurality of the expanders, and accordingly the life of the assembly is increased in this respect.

In Figs. 4, 5, 6, and 7, I illustrate various modifications of the principle of the present invention. In Fig. 4, there is provided a separate expander spring for each of the elements 5, 6, 7, the respective expanders being designated 12, 13, 14. In this form, each inner spring is in radial thrust engagement with one, and only one, ring element.

In Fig. 5, I illustrate an embodiment wherein a single expander spring 15 is utilized to expand the lower and upper elements 5, 6 respectively, the intermediate element 7 being of less radial thickness, whereby it is not contacted by the expander.

In Fig. 6, the embodiment illustrated has three elements 5, 6, 7 of equal radial thickness and a single expander spring 15 in radial thrust engagement with each thereof.

In Fig. 7, the spacer device, which is generally designated 16, consists of a thin cylinder wall contacting element 17 of materially less radial thickness than the elements 5, 6, which is spaced equally therefrom in an axial direction by means of a plurality of crimped or U-shaped flat clips 18 which are embedded at their free ends in indentations 19 in element 17. In this modification, I illustrate an expander spring 20 for the intermediate element 17 and an expander 21 for the outer elements 5 and 6; however it will be apparent that further modifications relative to the number and design of the expanders are available in the embodiment of Fig. 7.

It should be understood that although I have described each of the thin or ribbon-like intermediate elements 7 or 17 of my invention as being of steel and, as a matter of fact, this is the preferred construction, it is nevertheless possible to make the aforesaid intermediate elements of cast iron or other suitable material and thereby produce a ring which gives desirable operation. I now regard ribbon steel as the preferred material.

In each of the illustrated embodiments, the advantage of independent action of a plurality of thin hard cylinder wall contacting elements is attained and also the accompanying advantage of minimization of wear of the parts. Each form provides an effective wall contact throughout the entire peripheral dimension of the cylinder at all times and the result is that substantial economies in oil consumption and sealing action are effected.

I have illustrated and described my improvements in embodiments which are very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A composite piston ring assembly comprising a pair of annular thin split ribbon-like sections of steel adapted for edge engagement with a cylinder wall, means disposed behind said sections for radially urging the same outwardly, a spacer disposed between the sections to maintain the same in axially spaced relation, comprising a thin split ribbon-like element engageable with the cylinder wall between the sections, and a plurality of circumferentially spaced rivet-like members extending axially through the element and having portions disposed on either axial side thereof in rigid sustaining engagement with the sections to maintain the same in operative spaced relation, and an inner expanding spring disposed behind said ribbon-like element and engaging the element only to urge the spacer radially outwardly independently of the sections, whereby the spacer is contacted throughout an axial distance substantially less than the full axial spacer dimension so that wear on said spring by the spacer is decreased, said rivet-like members providing therebetween ample drainage space therebetween for oil past the spacer.

2. A composite piston ring assembly comprising a pair of annular thin split expansible ribbon-like sections adapted for edge engagement with a cylinder wall, a spacer disposed between the sections to maintain the same in axially spaced relation, said spacer comprising a thin split ribbon-like element engageable with the cylinder wall, a plurality of circumferentially spaced rivet-like members extending axially through the element and having portions disposed on either axial side thereof in rigid sustaining engagement with the sections to maintain the same in operative spaced relation, and inner expanding means disposed behind said ribbon-like element and engaging the same independently of said sections to urge the spacer radially outwardly independently of the sections, said rivet-like members providing therebetween ample drainage space therebetween for oil past the spacer.

3. A composite piston ring assembly comprising a pair of annular thin split expansible ribbon-like sections adapted for edge engagement with a cylinder wall, a spacer associated with the sections to maintain the same in operative parallel relation, said spacer comprising a thin split element, and a plurality of circumferentially spaced rivet-like members extending axially of and carried by said element, said members having portions disposed on at least one axial side of the element and in engagement with a section to maintain the same in operative position, and an annular split inner expanding spring disposed behind said spacer and exerting radial expansive action on the element of the spacer only to urge the spacer radially outwardly independently of the sections, said rivet-like members providing therebetween ample drainage space therebetween for oil past the spacer.

4. A composite piston ring assembly comprising a pair of thin split ribbon steel sections adapted for edge engagement with a cylinder wall, means disposed behind said sections for radially urging the same outwardly, a spacer disposed between the sections to maintain the same in axially spaced relation, said spacer comprising an annular split element of ribbon steel adapted to engage the cylinder wall, and a plurality of circumferentially spaced lug-like members carried by the element and having portions disposed on either axial side thereof in sustaining engagement with the sections, said members providing therebetween ample drainage space for oil through the spacer.

5. A composite piston ring assembly comprising a pair of thin split expansible ribbon steel sections adapted for edge engagement with a cylinder wall, a spacer associated with the sections to maintain the same in operative parallel relation, said spacer comprising an annular split ribbon-like element, a plurality of circumferentially spaced axially extending lug-like members carried by the element and having portions disposed on at least one axial side thereof in sustaining engagement with an adjacent section, said lug-like members providing ample drainage space for oil through the spacer, and spring means in radial thrust engagement with said spacer element only and independently of the sections to urge the spacer radially outward.

6. A composite piston ring assembly comprising a pair of thin split expansible cylinder wall engaging sections of ribbon steel, an intermediate spacer member comprising a thin split expansible cylinder wall engaging element of ribbon steel having a plurality of circumferentially spaced lug members disposed axially thereof for supporting engagement with said sections, an annular expander acting on said pair of sections, and a second annular expander acting on the said wall engaging element of said intermediate spacer member.

7. A composite piston ring assembly comprising a pair of thin split ribbon-like sections adapted to be disposed parallel and on edge to engage a cylinder wall, expanding spring means engaging said sections to thrust the same radially, an annular spacer associated with said sections and having a cylinder wall engaging portion and means to rigidly maintain the sections in parallel operative relation, said spacer having oil drainage openings of substantial size therein, and an annular split expanding spring in restricted axial engagement with said spacer and free from thrust engagement with said sections to thereby urge the wall engaging portion of the spacer radially outwardly independently of the sections, said last named spring contacting the spacer throughout an axial distance substantially less than the axial space occupied by the spacer to thereby decrease wear on the spring by the spacer.

8. A composite piston ring assembly comprising a pair of expansible thin split steel ribbon-like sections adapted to engage a cylinder wall, a spacer associated with said sections and having a steel cylinder wall engaging portion and means projecting axially on opposite axial sides thereof to rigidly maintain the sections in operative parallel relation, and an annular split expanding spring in restricted axial engagement with said spacer and free from thrust engagement with said sections to thereby urge the wall engaging portion of the spacer radially outwardly independently of the sections, said last named spring contacting the spacer throughout an axial distance substantially less than the axial space occupied by the spacer to thereby decrease wear on the spring by the spacer.

9. A composite piston ring assembly comprising annular thin split expansible cylinder wall engaging side members of wear resisting material, an intermediate spacer member disposed between said side members and comprising a thin split cylinder wall engaging member of wear resisting material, and lug-like members carried by said cylinder wall engaging member for spacing coaction with said side members whereby said intermediate member and side members are held in relative spaced relation, and expander means independently acting on at least one of said side members and on said intermediate cylinder wall engaging member.

10. A composite piston ring assembly comprising annular thin split expansible cylinder wall engaging side members, an intermediate spacer member disposed between said side members and comprising a thin split cylinder wall engaging member, and lug-like members carried by said cylinder wall engaging member for spacing coaction with said side members whereby said intermediate member and side members are held in relative spaced relation, and expander means independently acting on said side members and on said intermediate spacer member independently of the side members.

11. A composite piston ring assembly comprising a pair of expansible thin split ribbon-like sections adapted to engage a cylinder wall, expanding spring means engaging said sections to thrust the same radially against the wall, a spacer associated with said sections and having a cylinder wall engaging portion and spaced axially extending lugs to rigidly maintain the sections in operative parallel relation, and an annular split expanding spring in restricted axial engagement with said spacer and free from thrust engagement with said sections to thereby urge the wall engaging portion of the spacer radially outwardly independently of the sections, said last named spring contacting the spacer throughout an axial distance substantially less than the axial space occupied by the spacer to thereby decrease wear on the spring by the spacer.

HAROLD P. PHILLIPS.